Aug. 31, 1926.  
E. A. QUICK  
TIRE BOOT  
Filed May 14, 1925  
1,598,151  
2 Sheets-Sheet 1
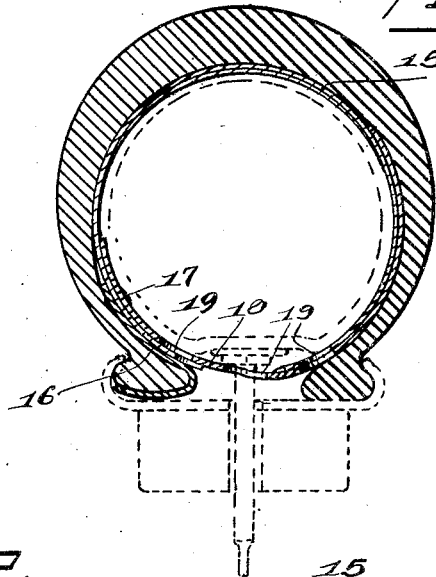
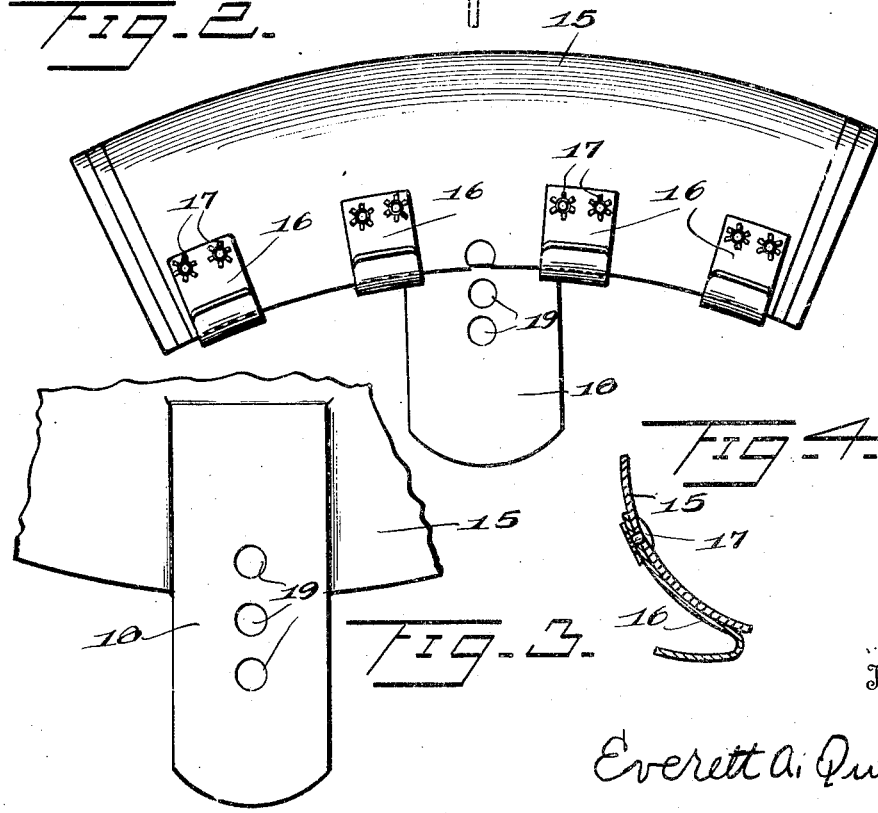
Inventor  
Everett A. Quick Aug. 31, 1926.  
E. A. QUICK  
TIRE BOOT  
Filed May 14, 1925
1,598,151
2 Sheets-Sheet 2
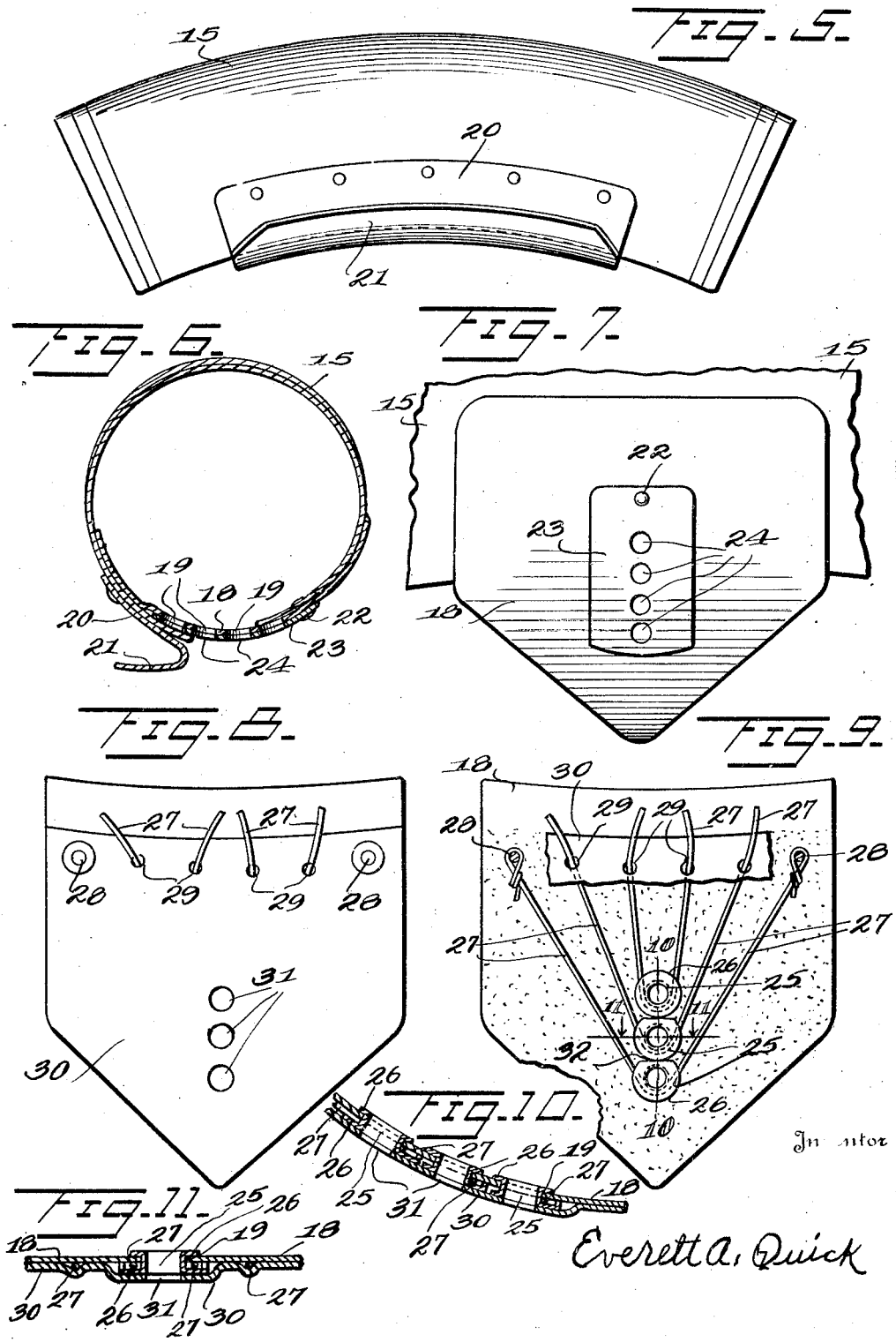
Everett A. Quick Patented Aug. 31, 1926.

1,598,151

UNITED STATES PATENT OFFICE.

EVERETT A. QUICK, OF SPRINGDALE, ARKANSAS.

TIRE BOOT.

Application filed May 14, 1925. Serial No. 30,314.

The present invention relates to a tire boot, and aims to provide a novel and improved device of this character which may be conveniently placed in a tire casing for efficiently supporting a weak point in the casing, thereby relieving strain subjected by the inflation of a tire tube or road travel of the casing.

Another object of the invention is the provision of a tire boot having means on one edge thereof for attachment to the bead of a casing and an extension flap on the opposite edge provided with a series of openings therein for receiving the valve stem of a tire tube for supporting a casing at a weak point, said boot receiving the strain from an inflated tube, the series of openings permitting an adjustment for associating the boot with casings of various sizes.

A further object of the invention is to provide a flexible extension flap with openings therein for anchoring one edge of the boot to a valve stem, said openings having arranged thereabout reinforcing means to prevent said openings from tearing or from being stretched or distorted out of their proper positions when my improved boot is in use.

It is also an object of the invention to provide a tire boot of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:

Figure 1 is a cross section through a tire casing, showing my improved device in section arranged therein, and illustrating a tire tube and rim in dotted lines, Figure 2 is a side elevation of my improved boot, Figure 3 is a fragmentary plan showing the extension flap, Figure 4 is a fragmentary section of the edge of my improved boot which is anchored to the bead of a casing, Figure 5 is a side elevation of a slightly modified form, Figure 6 is a cross section through the modified form, Figure 7 is a fragmentary plan of the flap of the modified form, Figure 8 is a plan view of a still further modified form of flap, Figure 9 is a section through the form of my invention illustrated in Figure 8, Figure 10 is a section taken on line 10—10 of Figure 9, and Figure 11 is a section taken on line 11—11 of Figure 9.

In carrying out the invention the numeral 15 designates the body of my improved boot, which is composed of a series of fabric members vulcanized together. Adjacent one marginal edge of the body 15 is secured a series of metallic hook-shaped members 16, said hook-shaped members being secured to the body by means of rivets 17, or the like. By referring to Figure 1 of the official drawings it will be noted that the hook-shaped members 16 engage under the bead of the tire casing for anchoring one side of the body 15.

Attached to the opposite marginal edge of the body 15 by vulcanizing or any other improved method is secured a flexible extension flap 18, said flap having a series of apertures 19 arranged at spaced intervals for permitting the valve stem of a tube to extend through any one of said openings 19. By providing a series of openings my improved boot may be associated with tire casings of various sizes, thus eliminating the necessity of a dealer carrying different size boots for various size tires.

In operation my improved boot is placed within the tire casing with the metallic hooks 16 engaging under the bead on one side of the tire casing. The boot is then spread out so as to snugly engage the casing at a point where the same has been weakened by either a rim cut, puncture, or blow-out. The inner tube is then placed within the casing and slightly inflated so as to force the boot in snug engagement with both the tube and casing. By then inserting the valve stem through the opening 19 in the extension flap 18 that is arranged centrally of the casing, the casing can then be placed upon the rim. By then inflating the tube to its full pressure both marginal edges of the boot will be anchored, as the opening through which the valve stem extends will hold the marginal edge of the boot to which the flap is attached, the valve stem being held against movement by engagement with the rim upon which the casing is mounted. It can be seen that my improved boot will receive the strain subjected by the inflation of the tube thereby supporting the casing at its weak point.

In Figures 5, 6, and 7, I have shown a modified form whereby a single metallic strip 20 is riveted, or otherwise secured, to one marginal edge of the body 15 instead of providing a series of hooks as shown in the above referred to form of my invention. The strip 20 is arcuate and is provided with a side extension 21 which engages under the bead on one side of the tire casing. On the flap 18 I have secured by means of a rivet 22 a metallic plate 23 having a series of apertures 24 therein which align with the apertures in the flexible extension strip 18 for receiving the strain at the openings 19 in the flap 18 thereby preventing said openings from being distorted or torn out when the tube is inflated.

In Figures 8, 9, 10, and 11, I have shown a still further modified form of supporting means about the apertures in the extension flap 18, which will prevent the stretching of the flap and the distorting of the openings therein. In this form, an eyelet 25 is positioned in each of the openings 19 in the flap 18, said eyelets having a pair of annular flanges 26 on each side thereof between which is clamped portions of the flap adjacent the openings and portions of flexible wires 27 which have their ends extending towards the marginal edge of the body 15 and secured to rivets 28 or extended through openings 29 in a supplemental flap 30 positioned over the flap 18, said supplemental flap being secured to the main flap by means of the rivets 28. The supplemental flap 30 has openings 31 therein which align with the openings in the eyelets 25 for permitting the valve stem to extend therethrough. By referring to Figure 9 it will be noted that certain of the eyelets 25 have their flange 26 cut away, as at 32, for permitting the flanges of said eyelets to contact, thereby providing a means whereby the eyelets will be supported by each other. The supplemental flap 30 can be vulcanized to the flap 18 which will form additional means for securing the wires 27 for supporting the eyelets 25.

From the foregoing it can be seen that I have provided a tire boot which will relieve all strain on the tire casing at a weak point, said boot being so constructed as to not give or stretch yet being adjusted in the casing for efficiently supporting the casing.

Having thus described my invention, what I claim as new is:

1. A tire boot comprising a fabric body, means arranged at one edge of said body for engaging the bead of a tire casing, and means carried by the opposite edge of said body for adjustably anchoring said opposite edge.

2. A tire boot in combination with a tire casing and tube, comprising a fabric body adapted to be arranged between said tube and casing, means arranged at one edge of said body for engaging the bead of the tire casing, and means carried by the opposite edge of said body for adjustably engaging the valve stem of the tube for anchoring said opposite edge.

3. A tire boot in combination with a tire casing and tube, comprising a fabric body adapted to be arranged between said tube and casing, means arranged at one edge of said body for engaging the bead of the tire casing, and an extension flap secured to the opposite edge of said body, said flap having a series of apertures arranged longitudinally therein at spaced intervals for permitting the valve stem of the tube to extend through any one of the same for anchoring the edge of the body to which the flap is secured.

4. A tire boot in combination with a tire casing and tube, comprising a fabric body, means for anchoring one edge of said fabric body, an extension flap carried at the opposite edge of said body, said extension flap having a series of apertures therein, and metallic means arranged about each of said openings for preventing the stretching thereof when the valve stem of the tube is extended therethrough.

5. A tire boot in combination with a tire casing and tube, comprising a fabric body adapted to be positioned between said casing and tube, means arranged at one edge of said body for engaging the bead of the tire casing, a flap secured to the opposite edge of said body, said flap having a series of openings therein any one of which may receive the valve stem of the tube for adjustably anchoring the edge of the body to which the flap is secured, and means arranged adjacent each of said openings for reinforcing the same.

6. A tire boot in combination with a tire casing and tube, comprising a fabric body adapted to be positioned between said casing and tube, means arranged at one edge of said body for engaging the bead of the tire casing, a flap secured to the opposite edge of said body, said flap having a series of openings therein any one of which may receive the valve stem of the tube for adjustably anchoring the edge of the body to which the flap is secured, an eyelet arranged in each of said openings, wires arranged about said eyelets, means for anchoring the ends of said wires, and a supplemental flap positioned over said first mentioned flap.

In testimony whereof, I have affixed my signature.

EVERETT A. QUICK.